Aug. 12, 1958 C. W. MOTT 2,847,068
ELASTIC BAND FORMING AND FEEDING APPARATUS
Original Filed Nov. 20, 1948 2 Sheets-Sheet 1

INVENTOR.
Carl W. Mott

Aug. 12, 1958 C. W. MOTT 2,847,068
ELASTIC BAND FORMING AND FEEDING APPARATUS
Original Filed Nov. 20, 1948 2 Sheets-Sheet 2
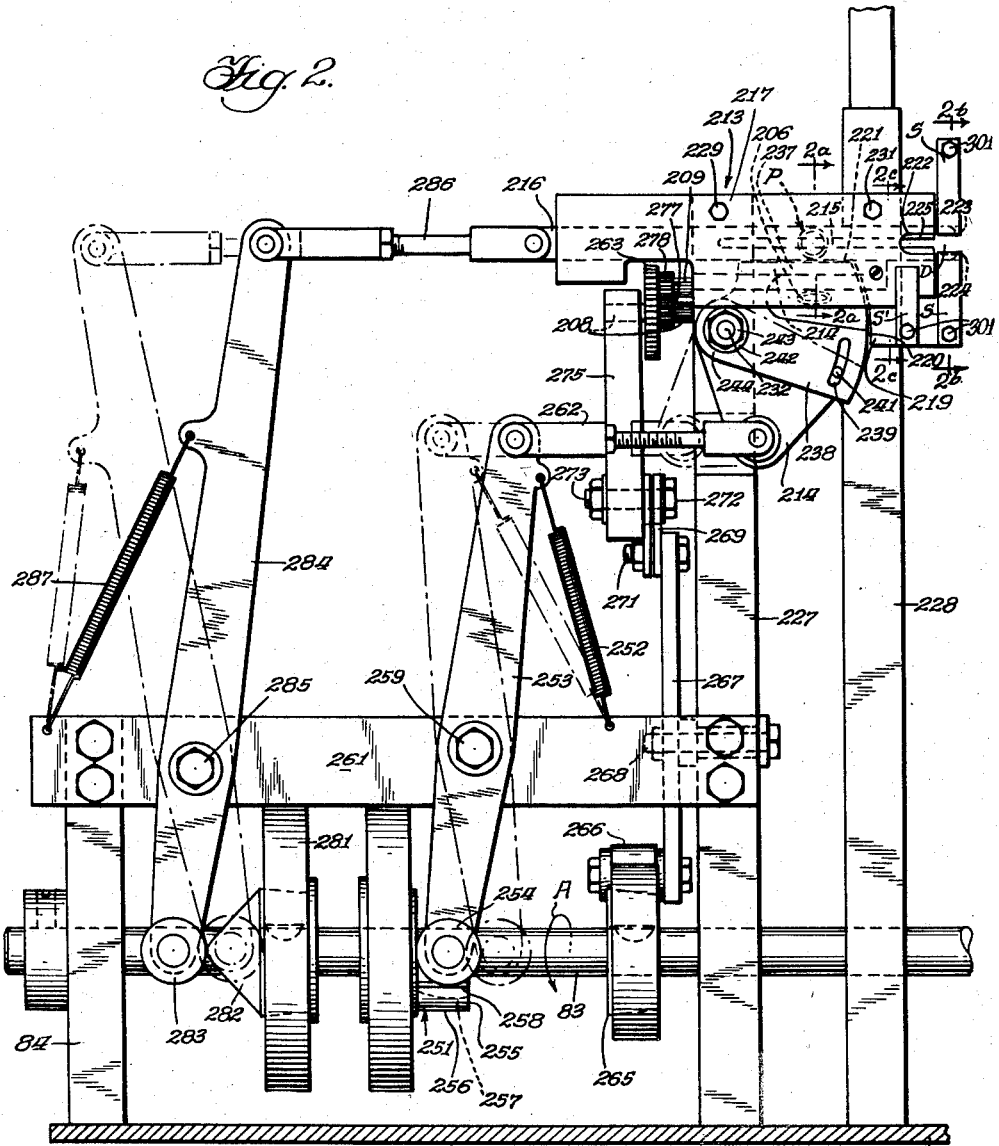
Fig. 2.
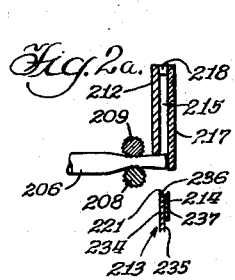
Fig. 2a.
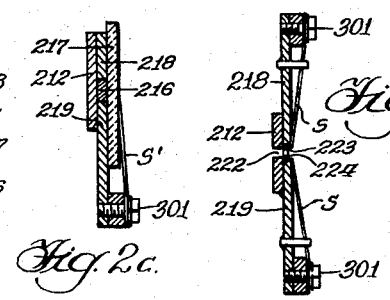
Fig. 2b.
Fig. 2c.
INVENTOR.
Carl W. Mott
BY
Atty.

United States Patent Office 2,847,068
Patented Aug. 12, 1958

2,847,068

ELASTIC BAND FORMING AND FEEDING APPARATUS

Carl W. Mott, Lake Ozark, Mo., assignor, by mesne assignments, to The Kendall Company, Boston, Mass., a corporation of Massachusetts Original application November 20, 1948, Serial No. 61,224, now Patent No. 2,709,836, dated June 7, 1955. Divided and this application October 11, 1954, Serial No. 461,586

9 Claims. (Cl. 164—42)

This invention concerns apparatus for forming elastic bands by slicing transverse sections from a tube of elastic material such as rubber, and delivering the annular slices or bands into a delivery portion of the apparatus from which such bands are extractable.

This application, which is a division of my co-pending parent application Serial No. 61,224, filed November 20, 1948, for Machine for and Method of Making Surgical Sponges, issued into Patent No. 2,709,836, is based upon a subcombination of said machine.

A general object of this invention is the provision of apparatus operable to progressively feed a tube of elastic material such as rubber or a synthesized elastic material into a slicer section of the apparatus where transverse sections are successively cut from the advanced leading end of the tube, employing the slicing or shearing mechanism to successively part way deliver the removed slices or bands to a discharge section of the machine, and employing a supplementing instrumentality which may be in the form of a ram for completing delivery of the bands to said delivery section of the apparatus.

Further objects of the invention include:

A novel mechanism for intermittently advancing a tube of elastic material into a slicing or shearing mechanism; a novel shearing mechanism operable to slice annular rubber-band-forming sections from the leading end of the intermittently advanced tube; a unique delivery passage disposed for successively receiving rubber bands as they are delivered thereto by the shearing mechanism and adapted to guide such rubber bands into a delivery section of the machine while facilitating movement of such bands transversely of their principal axes; and a feeding ram operable in timed relation with the delivery of the bands from the slicing mechanism for engaging and imparting an advancing force to each band within the chute subsequent to its delivery thereto by the shearing mechanism; and a novel rubber band delivery section adapted to releasably retain the rubber bands delivered thereto through the delivery chute.

The above and other desirable objects inherent in and encompassed by the invention are elucidated in the ensuing description, the appended claims and the annexed drawings, wherein:

Fig. 2 is a view of enlarged scale taken at the plane indicated by the line 2—2 in Fig. 1, with certain of the parts having another operating position illustrated by broken lines.

Figure 1:
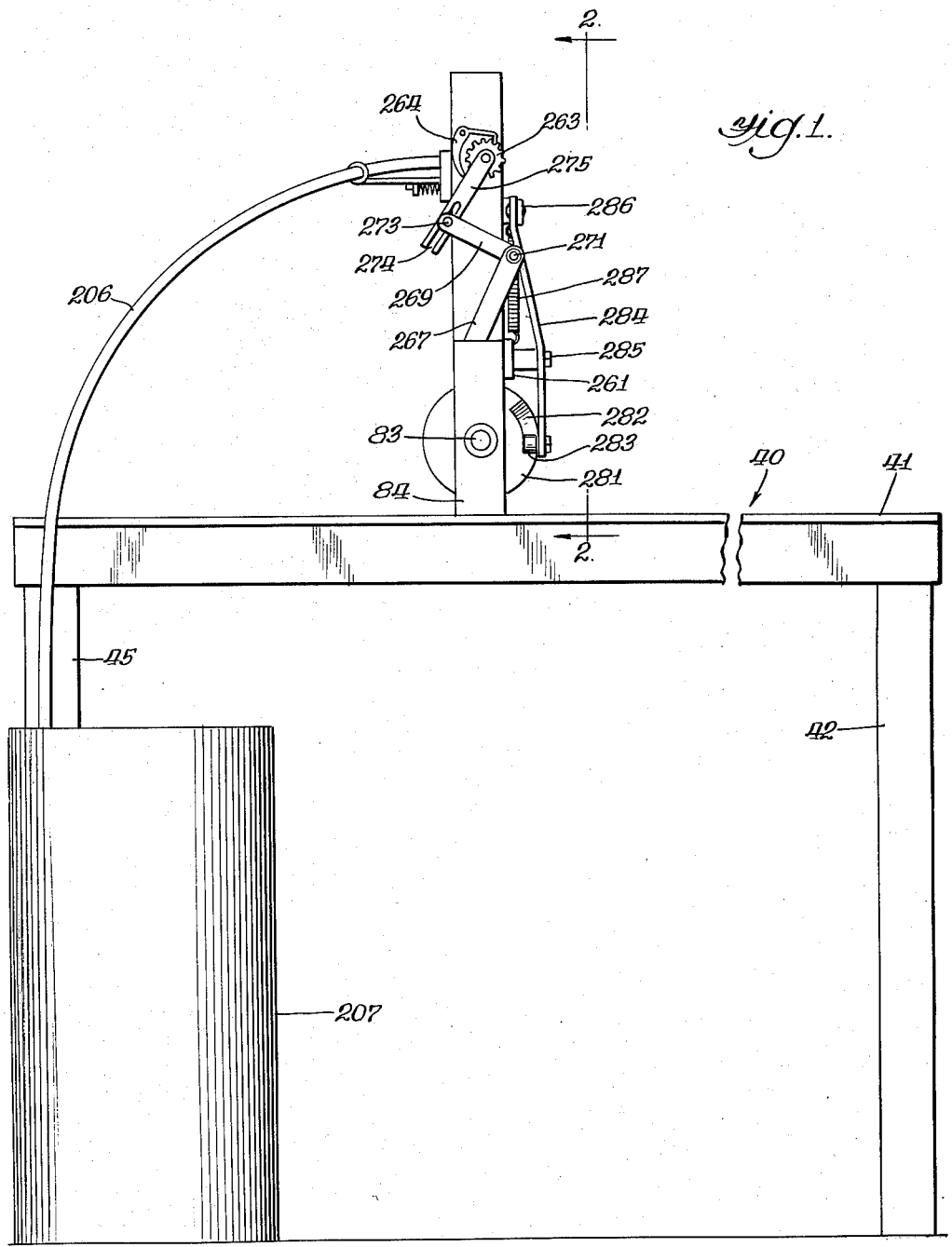
Fig. 1 is a side elevational view of apparatus constituting the preferred form of the invention, and showing the same mounted upon a fragmentarily shown bench which is adapted to support other components cooperable with such apparatus to form a machine for making surgical sponges illustrated and claimed in said patent application Serial No. 61,224.

Figs. 2a, 2b and 2c are sectional views taken respectively on the lines 2a—2a, 2b—2b and 2c—2c of Fig. 2.

Referring now to Fig. 1, the bench or table-like structure 40 has a horizontal substantially square metal plate top 41 and four legs at the respective corners of the top. Only two of such legs, 42 and 45 are visible in Fig. 1. A power-driven cam shaft 83 having an end journalled in a bearing member 84 is constantly rotated clockwise as viewed in Fig. 1 and in the direction indicated by the arrow A associated therewith in Fig. 2. The moving parts of the apparatus receive power through various cams driven by this cam shaft.

The apparatus forms the rubber bands from a rubber tube 206, Figs. 1, 2 and 2a, which is drawn endwise by the apparatus out of a container 207 resting on the floor by the machine. An advanced end portion of the rubber tube is gripped between a pair of serrated rollers 208 and 209. The manner in which the two rollers 208 and 209 engage the rubber tube and advance it endwise across the under shearing edge of the back wall 212 of a rubber band shearing and feeding head 213 is illustrated in Fig. 2a. The rollers 208 and 209 are intermittently rotated to advance the tube 206 endwise into a tube-receiving section of the shearing and feeding head a distance corresponding to the desired thickness of the rubber bands which are formed by shearing off the inwardly advanced end portion. This tube-receiving section is constituted by the space shown in Fig. 2a immediately below the chute rear wall 212 and rearwardly of the lower portion of a front wall 217 of a band feeding chute 215. A knife 214 is moved upwardly immediately after each advance of the rubber tube end portion into the shearing and feeding head and cooperates with the rear wall 212 for shearing off a rubber band and moving it upwardly into position P into the horizontal feeding chute 215 of such head. Subsequent to movement of the rubber band to position P, a plunger 216 is caused to move to the right as viewed in Fig. 2 for transferring the rubber band to a delivery position D. While presented at the delivery position each rubber band is entered by picking fingers of a rubber band transferring mechanism (illustrated in said parent application) for transfer of such bands to the tampon assembling mechanism (illustrated in said parent application).

Referring now more particularly to the structure of the shearing and feeding head 213, it can be seen in Figs. 2a and 2c to have in addition to the rear wall 212 the front wall 217 which is preferably of a transparent plastic material. An upper side of the delivery chute 215 is formed by a plate 218 disposed between the back wall 212 and the front wall 217. A lower side of the chute 215 is formed by a plate 219 interposed between the front and back walls 217 and 212; see Fig. 2c. The plate 219 is sufficiently short lengthwise of the feeding chute 215 and provided with a curved end 220 to provide clearance for the knife 214 so that the cutting edge 221 of this knife can enter the lower side of the head 213 and move upwardly between the walls 212 and 217 to deliver the rubber band cut thereby from the tube into the position P. The right end of the walls 217 and 212 as viewed in Fig. 2 have registering horizontal notches 222 for accommodating part of the rubber band transferring mechanism illustrated in the parent application. The right end of the plunger or ram 216 also has a notch, 225, which registers with the notches 222 while the plunger is in its rightmost position. There are opposed bosslike projecting portions 223 and 224 on the right ends of the plates 218—219, as viewed in Figs. 2 and 2b, to provide constricting means resisting accidental movement of the rubber bands beyond the delivery position D.

The rubber band cutting and feeding head 213 is mounted upon frame uprights 227 and 228 by bolts 229 and 231. Frame upright 227 also carries a bolt 232 for pivotally attaching the knife 214 to such upright in cooperative relation with the remainder of the head 213. The body of the knife 214 is substantially sector shaped, the upper edge 221 of the knife being its cutting edge. This cutting edge 221 of the knife lies in substantial parallelism with the lower edge of the rear wall 212 of the cutting head when the knife is in its operated counter-clockwise position. Consequently, when the knife is in its retracted clockwise position, the cutting edge 221 will be arranged divergently to the lower edge of the rear wall 212 to cooperate therewith in scissor-like fashion for cutting off an end section of the rubber tube. The knife 214 has a rear or back face 234, Fig. 2a, and a forward face 235. Said back face 234 is advanced upwardly along and in opposed relation with the inner surface of the back wall 212 pursuant to cutting the end section from the band and moving such end section, after it has been cut off, upwardly toward the chute 215. The cutting edge 221 of the knife structure is formed on a line of intersection of such back face 234 with an upper beveled edge 236 of the knife body and which beveled edge extends downwardly and forwardly from such back face 234 to the forward face 235 of the knife body. A rubber band pusher element 237 disposed upon the forward face 235 of the knife body contiguously with the beveled edge 236, is also pivotally carried upon the shank of bolt 232. Said pusher element has an extension arm 238 containing an arcuate slot 239 which receives a threaded stud 241 anchored in the body of the knife and for receiving a nut, not shown, for holding the band pusher element 237 and the knife body in a selected circumferential position so that the pusher element occupies the position of contiguity with the beveled edge 236 of the knife body as illustrated in Fig. 2a. The pusher element 237 prevents a rubber band from being wedged between the diagonal or beveled edge 236 of the knife body and the front wall 217 of the cutting and feeding head subsequent to the cutting off of the rubber band and pursuant to its being moved to position P.

While the knife is in its retracted clockwise position, Fig. 2, a coil spring 242 reacting between the nut 243 on the threaded bolt shank 232 and the hub portion 244 of the pusher element 237 presses the knife body into a position causing the knife edge 221 to extend slightly diagonally across the lower edge of the rear wall 212 of the cutting and feeding head in much the same manner that the blades of scissors are disposed in slightly crossed relation while being operated, so that a traveling point of contact obtains between the shearing edges as the blades are closed. Consequently, as the edge of the knife is swung upwardly while cooperating in scissor-like fashion with the lower edge of the rear wall 212, the body of the knife and the band pusher element are cammed forwardly across the lower edge of the rear wall. This projects the forward side of the pusher element forwardly, as permitted by the spring 242, wherefore the front wall 217 of the cutting and feeding head is secured to the rear wall 212 only at upper portions by the bolts 229 and 231, and this forward wall is made resilient and flexible so that it can be displaced forwardly by the forward and upwardly moving pusher element rubbing against its back inner surface.

Pivoting of the knife 214 is obtained by the cooperative action of a cam 251 secured for rotation with the constantly rotating cross shaft 83, Figs. 1 and 2, and a contraction spring 252, Fig. 2. The spring 252 urges a lever 253 to pivot clockwise for maintaining a roller follower 254 on its lower end in engagement with the profile of the cam 251. This profile includes a flat section 255 on the end of an axially projecting lobe 256, an inclined profile portion 257 leading up one side of the lobe to the flat section 255, and a drop-off portion 258 at the opposite side on the lobe 256. A fixed pivot 259 for the arm 253 is anchored in a frame member 261. The upper end of the lever 253 is connected by an adjustable link 262 with the knife 214. When the cam lobe 256 passes beneath the roller 254, the knife 214 will be pivoted clockwise for swinging its cutting edge 221 downwardly below the position in which the rubber tube is fed endwise into the cutting and feeding head, that is, into the position illustrated in Fig. 2a. Later, when the lobe 256 passes from registration with the roller 254 to allow this roller to drop to the left, as viewed in Fig. 2, along the profile portion 258, the spring 252 will pivot the lever clockwise for swinging the knife 214 counter-clockwise and thereby moving its cutting edge 221 upwardly for cutting an end portion of the rubber tube off and delivering this cut-off end portion constituting a rubber band into position P in the feeding chute 215.

While the knife was in the position illustrated, in Fig. 2a, the serrated feeding rollers 208—209 were caused to rotate an amount for advancing an end portion of the rubber tube into the cutting and feeding head preparatory to its being cut off by the subsequently pivoted knife. Intermittent rotation of the feeding rollers 208—209 in timed relation with the operation of the knife 214 is obtained by a ratchet and pawl drive 263—264, Fig. 1, which receives operating force from a circular cam 265 mounted eccentrically on the constantly rotating shaft 83, Fig. 2. A cam follower roller 266 cooperates with the cam 265 for oscillating a lever 267 having a fixed pivot 268 secured to the frame upright 227. The upper end of the lever 267 has an arm 269 secured thereto in selective angular relation by a bolt 271. The free end of the arm 269 carries a bolt 272 of which the shank 273 is movable in a slot 274 of an arm 275 pivoted relatively to and concentrically of the roller 208 with which the ratchet wheel 263 is constrained for rotation. A pair of companion gears 277—278 respectively upon the serrated shafts 208—209 cause these two shafts to rotate synchronously in opposite directions. Counterclockwise rotation of the lever 267 as viewed in Fig. 1, caused by throw of the circular eccentric 265 toward the front side of the shaft 83 and consequent forward displacement of the follower 266, causes the bolt shank 273 to move the pawl-carrying arm 275 for rotating the ratchet 263 clockwise by means of the pawl 264. An examination of Figs. 2 and 2a will disclose that such clockwise rotation of the ratchet 263 and of the gear 277 will cause the gear 278 to rotate counter-clockwise. Thus the two serrated rollers 208—209 will be rotated in a complementary manner for advancing the rubber tube 206 endwise toward the feeding and cutting head. The amount of endwise advancement of the rubber tube can be selectively varied by loosening the bolt 271, Fig. 2, and swinging the arm 269, Figs. 1 and 2, about the shank of the bolt 271 for changing the position of the bolt shank 273 in the slot 274 and thereby changing the position of the bolt shank 273 radially of the pivot axis for the arm 275.

A cam 281, Fig. 2, having a lobe 282 spaced radially from the axis of the shaft 83 with which said cam is constrained for rotation, is operable through a follower roller 283 and a lever 284 pivoted at 285 on the frame member 261 for causing endwise reciprocation of an adjustable link 286 and consequently of the plunger 216 for transferring rubber bands from position P to the delivery position D. Endwise movement of the plunger 216 delivering rubber bands to position D occurs pursuant to the cam lobe 282 passing beneath the roller 283. Return movement of the plunger is effected by a spring 287 connected between the arm 284 and the frame member 261.

Operating sequence of the knife 214, the intermittently rotated and serrated rubber tube advancing rollers 208—209 and of the plunger 216 is such that while the knife 214 is in its lowered position, the rollers 208—209 will be rotated in projecting a short section of the tube into the cutting and feeding head. Following this the knife 214 is swung counter-clockwise, as viewed in Fig. 2, for severing the projected end portion of the rubber tube to form the rubber band and for moving this rubber band into position P in the feeding passage 215. Thereafter the plunger 216 is moved to the right for transferring the rubber band to position D. Prior to a succeeding intermittent rotating motion of the tube feeding rollers 208—209 the knife 214 will be swung clockwise to make room for a succeedingly advanced end portion of the tube, and prior to subsequent cutting movement of the knife 214 the plunger 216 will be retracted preparatory to making a succeeding band-delivery excursion. This cycle of operation of the parts in the rubber band forming and feeding mechanism is continuously repeated during continuous rotation of the shaft 83.

Spring fingers S, Figs. 2 and 2b, anchored respectively to the plates 218 and 219 by cap screws 301 project respectively downwardly and upwardly toward one another so that opposed adjacent end portions are disposed for engaging diametrically opposite sides of a rubber band to prevent axial movement thereof to the right as viewed in Fig. 2b as such rubber band at the delivery station D is being axially entered from the left, Fig. 2b, by picking fingers (not shown) of a picking instrumentality for extracting the band from the present apparatus. This picking instrumentality and the picking fingers thereof are illustrated in said parent application. These spring fingers S are useful for first holding the rubber band until said picking fingers (not shown) have completely entered the same so that the band will finally be loaded upon root portions of these picking fingers. The picking fingers have a sweeping motion which carries them through the slot 222, Fig. 2b, and between the opposed end portions of the spring fingers S. After the rubber band is telescoped on to the picking fingers to their root portions and can be advanced no further thereon, the spring fingers S allow the picking fingers and the band thereon to pass therebetween and then spring back to the position illustrated in Fig. 2b.

A third spring finger S', Figs. 2 and 2c, adjacent the lowermost finger S and also anchored to the plate 219 by a cap screw 301, presses against the transparent resilient plate 217 to supplement the resilient character thereof in resisting lateral displacement by the upwardly moving pusher element 237, Fig. 2a along the inner face of said plate 217 during the upward cutting stroke of the knife 214.

Having thus described a single preferred embodiment of the invention with the view of clearly and concisely illustrating the same, I claim:

1. In a mechanism for cutting a rubber band from a rubber tube and feeding such cut band, a cutting and feeding head having a band feeding chute with opposed inner sides and a tube-receiving section adjacent said chute, means for directing a tube into said section transversely to and adjacently to one of said sides, shearing means movable across said section toward said chute and along said one side thereof for shearing a transverse end portion from the tube to form a rubber band and to place such band in the chute, a plunger movable endwise in said chute in parallelism with the opposed inner sides thereof for transferring the band to a delivery position therein, and means operating said plunger coordinately with the shearing means to move the plunger endwise of the chute subsequent to such movement of the shearing means.

2. Rubber band feeding mechanism comprising a feeding chute having an inlet section for receiving said bands and also having a delivery section spaced endwise of the chute from said receiving section, the chute having opposed walls with which opposite axial ends of the bands are respectively contiguous to retain the bands oriented during movement thereof from the inlet section to the delivery section, said opposed walls of the chute terminating at said delivery section and having notches therein extending lengthwise of the chute and communicating endwise outwardly of such terminating ends of the walls, said wall ends being disposed with respect to the chute delivery section that at least part of the space encircled by a band in such delivery section is disposed beyond said wall ends axially of the chute, and a plunger reciprocal endwise in the chute for propelling said bands successively from the inlet section into the delivery section, said plunger having a bifurcated end portion individually engageable with the rubber bands at the inlet section for pushing them from such inlet section to the delivery section, and the space between the furcations of the plunger end portion providing communication between said notches in the chute walls while in registry therewith.

3. In a mechanism for cutting a rubber band from a rubber tube and feeding such cut band; a cutting and feeding head containing a horizontal feeding chute and comprising a back wall having a forward and inner surface of which a portion constitutes a back side of said chute, said wall having a lower edge below said chute and past which an end section of the rubber tube is projectable forwardly, said head also having a front wall with an inner surface of which a portion forms a forward side of the chute and a knife structure projectable upward relatively to and between said walls to carry an upper cutting edge of such structure past the lower edge of the rear wall and into the space between the wall inner surfaces, the cutting edge of the upwardly projected knife structure being cooperable in scissor-like fashion with said lower edge of the rear wall to cut off said end section of the tube incident to passing upwardly between the walls toward the chute, and said knife structure filling the space between the inner surfaces of said walls so as to be cooperable therewith to advance the cut-off band section therebetween toward and into the chute.

4. The combination set forth in claim 3 wherein said knife structure comprises a thin knife body having a back face which is advanced upwardly in opposed relation with the inner surface of the back wall pursuant to cutting the end section from the band and moving it upwardly toward the chute, the cutting edge of the knife structure being formed at a line of intersection of such back face of the knife body with an upper bevelled edge of such body extending downwardly and forwardly from such back face, and a band pusher element disposed upon said forward face of the knife body contiguously with said bevelled edge to prevent the band being crowded by such bevelled edge between the knife structure and the inner surface of the front wall of the cutting and feeding head.

5. The combination set forth in claim 3 wherein said knife structure comprises a thin knife body pivotally connected with the cutting and feeding head and having a back face which is advanced upwardly along and in opposed relation with the inner surface of said back wall pursuant to cutting the end section from the band and moving it upwardly toward the chute, the cutting edge of the knife structure being formed at a line of intersection of such back face of the knife body with an upper bevelled edge of such body extending downwardly and forwardly from such back face, a band pusher element disposed upon said forward face of the knife body contiguously with said bevelled edge, the pivotal connection of the knife structure with the cutting and feeding head being such that said cutting edge of the knife body extends slightly diagonally across the lower edge of the rear wall of said head while the cutting edge of said body is below said wall lower edge wherefore said body and the band pusher element are cammed forwardly as the knife body edge is swung upwardly across said wall lower edge, and the front wall of said head possessing elasticity to accommodate forward displacement thereof by said pusher element as the knife structure moves upwardly between said walls.

6. The combination set forth in claim 5 wherein said thin knife body slopes downwardly and forwardly from its cutting edge wherefore as the knife structure is cammed forwardly while being swung upwardly as aforesaid a lower edge portion of the front wall of the head is approached by the forward face of the knife body, and wherein said band pusher element is confined to a marginal portion of the knife body along said cutting edge, to provide clearance accommodating the back of the knife body to approach the lower edge of the front wall.

7. In a mechanism for cutting a rubber band from a rubber tube and feeding such cut band; a cutting and feeding head containing a feeding chute having a rubber band receiving end and having a side wall with an inner surface of which an edge terminates below such chute, means for projecting an end portion of a rubber tube across said edge into registry with the chute, a knife structure having a cutting edge cooperable in scissor like fashion with said edge of the wall to cut off such end portion of the tube incident to advancing into the chute and pushing the cut-off portion of the tube thereinto, cam means for withdrawing the knife structure retractively across said cutting edge and then suddenly releasing the knife structure, and spring means operably connected with the knife structure for advancing the knife structure across said wall edge following release of the knife structure by said cam-operated means.

8. In a mechanism for cutting a rubber band from a rubber tube and feeding such cut band; a knife structure comprising a knife body having opposite broad faces and a cutting edge formed at the intersection of one of said faces with a bevelled edge of such body extending to the opposite face thereof and intersecting the one face at an acute angle, a band pusher element disposed upon said opposite face of the knife body, said pusher element comprising a narrow portion extending along a marginal portion of the knife body adjacently to said edge and an adjuster portion spaced from the narrow portion by a cutaway portion of such element between such narrow portion and adjuster portion, and means cooperable with said adjuster portion and with the knife body for accommodating adjustment of the elongated portion transversely of said edge and retaining such adjustment.

9. In a mechanism for cutting a rubber band from a rubber tube and feeding such cut band; a knife structure comprising a thin knife body having opposite broad faces, said knife structure including means adapting it for mounting to pivot about an axis disposed perpendicularly to said body, said body having a cutting edge extending substantially radially from said axis and lying substantially within the plane of one of said faces, a band pusher element disposed upon the opposite face of said body for adjustment thereon rotatively about such axis, said pusher element comprising a narrow body portion extending along a marginal portion of the knife body adjacently to said edge and comprising an adjustor portion spaced from the narrow portion circumferentially of said axis, and means cooperable with said knife body and said adjustor portion of the pusher element for accommodating adjustment of the pusher element relatively to the knife body rotatively about said axis and for securing said body and element together for retaining said adjustment.

References Cited in the file of this patent

UNITED STATES PATENTS

| | | |
|---|---|---|
| 286,373 | Baumann | Oct. 9, 1883 |
| 731,312 | Lippengood | June 16, 1903 |
| 753,812 | Shelain | Mar. 1, 1904 |
| 771,752 | Stafford | Oct. 4, 1904 |
| 918,813 | Armstrong | Apr. 30, 1909 |
| 1,302,532 | Donaldson | May 6, 1919 |
| 1,646,222 | Shrope | Oct. 18, 1927 |
| 1,930,625 | Schurman | Oct. 17, 1933 |
| 1,968,669 | Arnold | July 31, 1934 |
| 2,271,028 | Olson | Jan. 27, 1942 |
| 2,404,901 | Cibs | July 30, 1946 |
| 2,709,836 | Mott | June 7, 1955 |